US007462129B2

(12) United States Patent
Hrovat et al.

(10) Patent No.: US 7,462,129 B2
(45) Date of Patent: Dec. 9, 2008

(54) DRIVELINE SHIFT QUALITY IN VARIABLE VALVE ENGINE EQUIPPED DRIVELINES (75) Inventors: Davor Hrovat, Ann Arbor, MI (US); Alex Gibson, Ann Arbor, MI (US); Ilya V. Kolmanovsky, Farmington Hills, MI (US); James McCallum, Ann Arbor, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

(21) Appl. No.: 11/199,918

(22) Filed: Aug. 8, 2005

(65) Prior Publication Data
US 2007/0032340 A1 Feb. 8, 2007

(51) Int. Cl.
*B60W 10/06* (2006.01)

(52) U.S. Cl. .................. 477/107; 477/102; 123/90.11; 123/90.15

(58) Field of Classification Search .............. 477/101, 477/107, 102, 109, 143, 154, 155; 701/54, 701/103, 110; 123/90.11, 90.15
See application file for complete search history.

(56) References Cited

U.S. PATENT DOCUMENTS 4,103,655 A * 8/1978 Coles ......................... 123/481
5,816,976 A * 10/1998 Kuroiwa et al. .............. 477/102
5,879,266 A * 3/1999 Sawamura et al. ........... 477/62
5,947,863 A    9/1999 Grob et al.
6,612,285 B2 * 9/2003 Ganoung ..................... 123/308
6,830,536 B2   12/2004 Tanaka et al.
6,840,887 B2 * 1/2005 Hrovat et al. ................. 477/78
7,240,663 B2 * 7/2007 Lewis et al. ................. 123/321
2003/0109357 A1  6/2003 Tabata
2004/0214687 A1 10/2004 Morisawa et al.
2005/0205063 A1* 9/2005 Kolmanovsky et al. ..... 123/436
2005/0205074 A1* 9/2005 Gibson et al. ............... 123/673

* cited by examiner

*Primary Examiner*—Ha D. Ho
(74) *Attorney, Agent, or Firm*—Allan J. Lippa; Alleman Hall McCoy Russell & Tuttle, LLP (57) ABSTRACT In one example, a method for controlling powertrain operation in a vehicle is provided, the powertrain having an engine and an automatic transmission, the engine having at least an electrically actuated cylinder valve. The method includes changing gears from a first discreet gear ratio to a second discreet gear ratio of the transmission; and increasing engine torque during a torque phase of said gear change by changing operation of the electrically actuated cylinder valve, and decreasing engine torque during an inertia phase of said gear change.

15 Claims, 7 Drawing Sheets

DRIVELINE SHIFT QUALITY IN VARIABLE VALVE ENGINE EQUIPPED DRIVELINES

BACKGROUND AND SUMMARY

Vehicle with automatic transmissions typically employ various approaches to control engine operation during shifting to improve drive feel. Specifically, in some cases, it can be desired to control the transmission output torque during up and/or down shifts so that a constant transmission output torque is maintained during a shift.

In some automatic transmissions, there may be large deviations in the transmission output torque during the torque and inertia phases of a shift event. In one approach, variation in the transmission output torque may be controlled by calibrating the capacity and timing of the on-coming and off-going clutches and by using spark retard to decrease the engine output torque during the inertia phase. However, while spark retard allows engine output torque to be rapidly decreased, there can be a penalty in increased fuel consumption and emissions. Further spark retard can generally only decrease the engine output torque from an optimal point.

Another approach to adjusting engine torque during a shift involves using an electronically controlled throttle. However, the responsiveness of throttle modulation may be limited by the intake manifold filling dynamics lag, and the responsiveness of the ETC actuator.

Still another approach that may be used is a crankshaft mounted starter alternator, SA, to decrease and/or increase, and modulate, the transmission input torque in response to a torque modulation request from the transmission control strategy. However, such an approach requires a sufficiently fast actuator to control the transmission input torque, such as a crankshaft mounted SA. While a SA can potentially be used to modulate the transmission input torque during a shift, the maximum torque capacity of a typical starter alternator may be less than half the engine torque capacity, thus limiting such an approach. Further, the SA torque may be inversely proportional to the SA shaft speed and may also be limited by the battery state of charge.

To address these and other issues, in one example, a method for controlling powertrain operation in a vehicle, the powertrain having an engine and an automatic transmission, the engine having at least an electrically actuated cylinder valve, is provided. The method comprises changing gears from a first discreet gear ratio to a second discreet gear ratio of the transmission; and increasing engine torque during a torque phase of said gear change by changing operation of the electrically actuated cylinder valve, and decreasing engine torque during an inertia phase of said gear change.

In this way, it is possible to generate a sufficiently high bandwidth torque increase to so that improved drive feel can be obtained during a shift, such as a shift from a lower gear to a higher gear. Further, this increase may be obtained without requiring a starter alternator or other such device, and without depleting battery storage.

In another aspect, a powertrain system for a passenger vehicle traveling on the road may be provided. The system comprises an engine, the engine having at least an electrically actuated cylinder valve; an automatic transmission; a torque converter coupled between the engine and the automatic transmission; and a controller configured to change gears from a first discreet gear ratio to a second discreet gear ratio of the transmission; and increase engine torque during a torque phase of said gear change by changing operation of the electrically actuated cylinder valve, and decreasing engine torque during an inertia phase of said gear change, wherein changing operation is adjusted based on an amount of slip across the torque converter.

In this way, it is possible not only to provide improved drive feel, but improved consistency from shift to shift can be provided via the additional feedback using the slip ratio.

DETAILED DESCRIPTION

Figure 1:
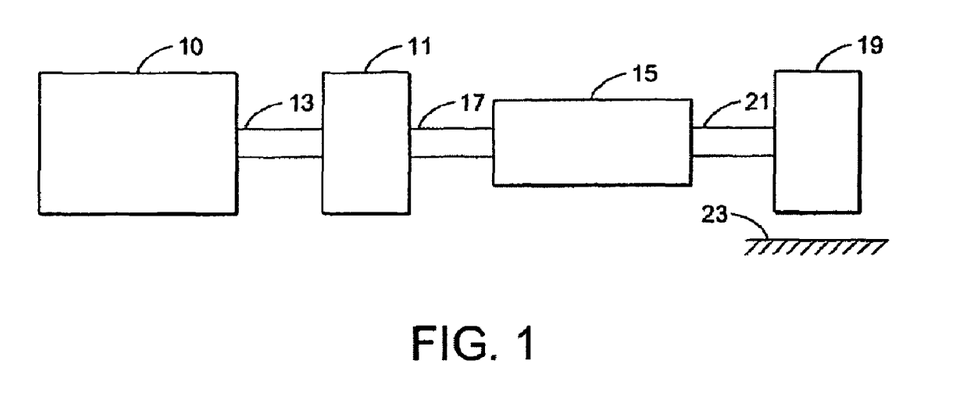
FIGS. 1-2 are block diagrams of a vehicle powertrain and an engine.
Figure 2:
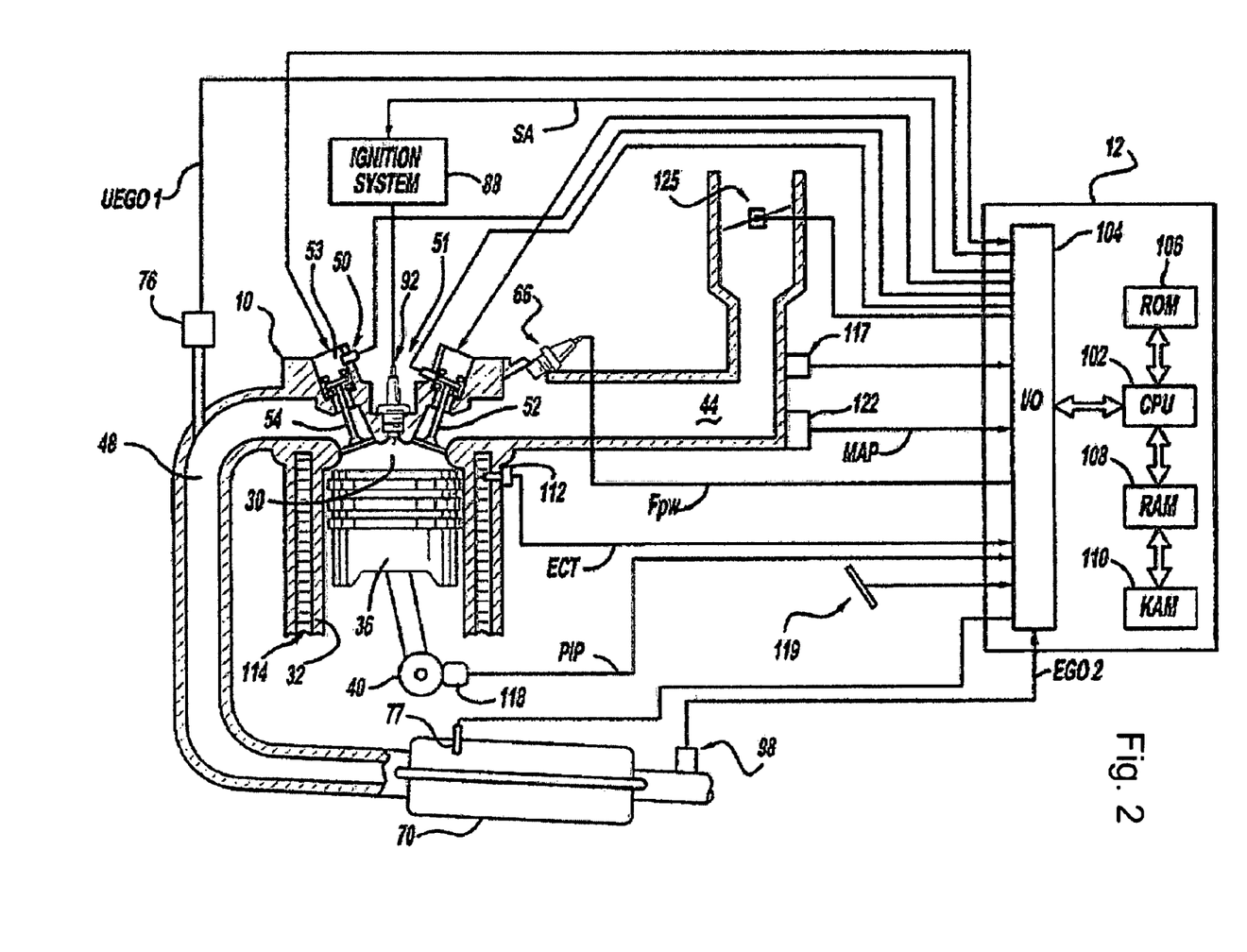

Referring to FIG. 1 an example powertrain of a vehicle is shown. Specifically, internal combustion engine 10, further described herein with particular reference to FIG. 2, is shown coupled to torque converter 11 via crankshaft 13. Torque converter 11 may also coupled to transmission 15 via transmission input shaft 17. Torque converter 11 may have a bypass clutch which can be engaged, disengaged, or partially engaged. When the clutch is either disengaged or partially engaged, the torque converter is said to be in an unlocked state. While this example shows an automatic transmission with a torque converter, a manual transmission may also be used, or no torque converter may be used.

Transmission 15 may comprise an electronically controlled transmission with a plurality of selectable discrete gear ratios. Transmission 15 may also comprise various other gears such as, for example, a final drive ratio (not shown). Transmission 15 is also coupled to tire 19 via axle 21. Tire 19 interfaces the vehicle (not shown) to the road 23. In one embodiment, transmission 15 has the following driver selectable options: park (P), reverse (R), neutral (N), drive (D), and low (L). The driver selects these positions via a transmission lever.

Referring to FIG. 2, internal combustion engine 10, comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve is operated by an electromechanically controlled valve coil and armature assembly 53. Armature temperature is determined by temperature sensor 51. Valve position is determined by position sensor 50. In an alternative example, each of valves actuators for valves 52 and 54 has a position sensor and a temperature sensor. In still another alternative, one or more of intake valve 52 and/or exhaust valve 54 may be cam actuated, and be capable of mechanical deactivation. For example, lifters may include deactivation mechanism for push-rod type cam actuated valves. Alternatively, deactivators in an overhead cam may be used, such as by switching to a zero-lift cam profile. Further still, variable valve lift actuators may also be used.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/ or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 2 as a conventional microcomputer including: microprocessor unit 102, input/output ports 104, and read-only memory 106, random access memory 108, 110 keep alive memory, and a conventional data bus. Controller 12 is shown receiving various signals from sensors coupled to engine 10, in addition to those signals previously discussed, including: engine coolant temperature (ETC) from temperature sensor 112 coupled to cooling sleeve 114; a position sensor 119 coupled to an accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 30, either in the cylinder head similar to spark plug 92, or on the side of the combustion chamber. Also, the engine may be coupled to an electric motor/battery system in a hybrid vehicle. The hybrid vehicle may have a parallel configuration, series configuration, or variation or combinations thereof.

While not shown, an accelerator pedal communicating with the driver's foot may be used, where an accelerator pedal position (PP) is measured by pedal position sensor coupled to the accelerator pedal and sent to controller 12.

As will be described in more detail below, one example approach described herein to improve shift quality in a transmission with discrete gear ratios, e.g. a 6-speed automatic with a torque converter, involves controlling the transmission output torque during up-shifts and/or down-shifts. Specifically, a substantially constant transmission output torque can be maintained during at least some shifts to improve drive feel. However, to achieve such operation, the torque output is controlled to be increased/decreased during the torque and inertia phases of a shift event in a prescribed manner.

One approach to provide such control is by calibrating the capacity and timing of the on-coming and off-going clutches and by using spark retard to decrease the engine output torque during the inertia phase. By using spark retard the engine output torque can be rapidly decreased, but there may be increased fuel consumption and emissions due to the amount of spark retard used. Further, spark retard generally only decreases engine output torque.

Another approach uses an electronically controlled throttle, ETC, to decrease or increase the engine torque. However, under some conditions, the responsiveness of engine torque to variations in ETC may be limited by the intake manifold filling dynamics lag and the responsiveness of the ETC actuator.

Still another approach uses a crankshaft mounted starter alternator, SA, to decrease and/or increase (or modulate) the transmission input torque in response to a torque modulation request from the transmission control strategy. While this may provide improved shift response, the costs of added such hardware may be excessive. Further, the maximum torque capacity of a typical starter alternator is less than half the engine torque capacity, and can be inversely proportional to the SA shaft speed, thus limiting the application. Further, the SA may be limited by the battery state of charge, and thus not able to improve shift response during various conditions.

Thus, in one embodiment, engine torque modulation via adjustment of electrically actuated valves may be used (alone or in addition to any of the approaches above). Specifically, in one example, the torque output of an EVA engine may be controlled in response to a transmission torque modulation request to produce improved control of the transmission output torque during a shift. Specifically, the engine is adjusted to vary valve timing, mode, fuel and spark on a cylinder-by-cylinder basis and if required the intake manifold pressure, via the ETC (if available), such as in the routines described below herein. Furthermore, a transmission input torque may be provided with an increasing gradient during the shift torque phase and a torque decrease during the shift inertia phase, coupled with control of the on-coming and off-going clutch timing and capacities, to provide improved shifting operation.

As noted above, valve adjustments, such as via an electrically actuated valve, or an electric or electro-hydraulic continuously variable valve lift actuator, may be used (along with adjustments to spark timing and fuel) to control engine output on a cylinder-by-cylinder basis to deliver a desired engine torque. Further, any given cylinder can operate as either a firing cylinder, (i.e. a cylinder that has air, fuel and spark to produce toque), or as a non-firing cylinder. By controlling the number of firing cylinders, the operating mode, of the firing and non-firing cylinders, intake manifold pressure, fuel and spark as a function of engine operating point (e.g. speed and load), it is possible to rapidly respond to engine torque requests and improve the fuel economy and reduce emissions.

One example method to improve fuel economy and reduce emissions in an engine with variable valve operation is to operate with a minimum number of firing cylinders per unit time allowed for a given operating point. By reducing the number of firing cylinders or the rate at which firing cylinders produce torque, e.g. 12-stroke vs. 4-stroke operation, the engine pumping losses can be reduced which improves the fuel economy. However, this is just one way to vary engine operating modes to improve operation. Various other modes of operation may be used, such as described below.

Figure 3:
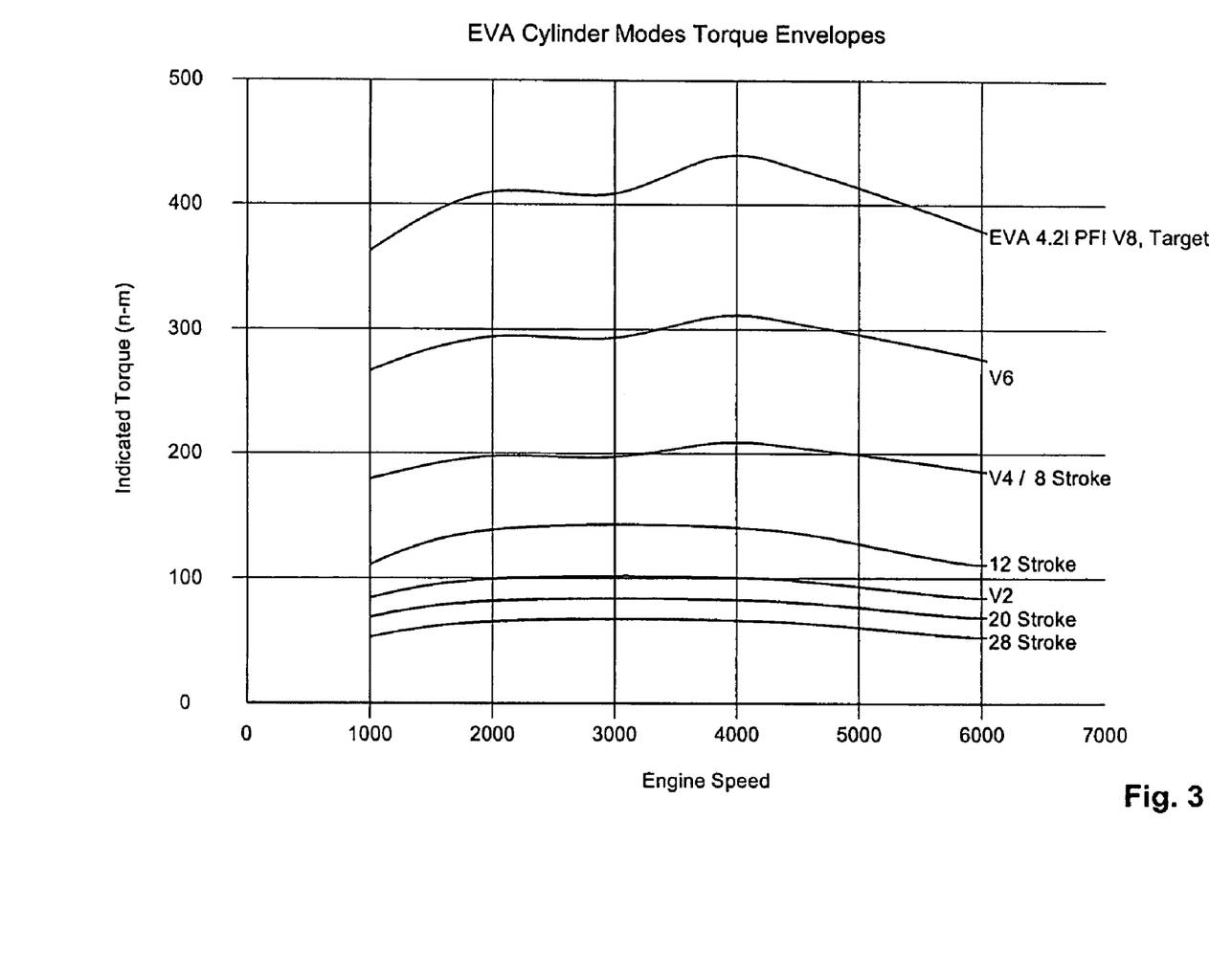
FIG. 3 shows engine cylinder mode vs. torque for an eight-cylinder EVA engine.

The selection of operating modes on an EVA engine, e.g. 4 vs. 8 cylinder or 12 vs. 4 stroke operation on an eight cylinder engine, may be constrained by the maximum torque available from a given mode. For example, the maximum torque available in 4 cylinder operation may limit the region where such operation is enabled. Further, they may be limits imposed by the valve actuation mechanism, such as minimum opening time. FIG. 3 shows an example range of maximum torque values for various modes in an example engine.

Continuing with other potential limits, some valve actuators can have a minimum transition time, (the time required to fully open or close the valve), and/or a minimum valve open duration (e.g., 45 to 50 crank angle degrees per thousand RPM). The minimum valve duration may limit the minimum torque that can be generated for a given number of firing cylinders at a given engine speed. As an example consider an EVA engine operating at 6,000 RPM with a minimum valve duration of 50 degrees per thousand RPM. Under these conditions, the minimum intake valve opening to closing duration is about 300 degrees. While there are a number of methods that can be used to lower the minimum torque per firing cylinder with a 300 degree intake valve duration (e.g., advancing the intake valve opening, IVO; the use of late intake valve closure, IVC, operation; retarding the spark timing and/or reducing the throttle angle and the intake manifold pressure), one specific approach that can improve fuel economy and reduce emissions is to reduce the number and/or firing rate of the firing cylinders and thereby reduce the total torque output of the engine.

Also, there may be torque variations in bridging the torque from one mode to another. To address such situations, it may be possible to use intake manifold pressure control to bridge any such gaps in a given EVA engine operating mode torque vs. engine speed map. One example method of controlling the intake manifold pressure in an EVA engine is to use intake manifold pressure and/or temperature feedback to actuate an electronically controlled throttle, ETC, at the intake manifold inlet. In one example embodiment, if under low load operation the valve timing required to achieve a commanded torque or air charge drops below a minimum valve duration achievable in a given operating mode, it is possible to switch to a different valve timing mode, e.g. 8 cyl vs. 4 cyl, to lower the minimum torque for a given minimum valve duration. Alternatively the valve timing or spark can be adjusted to reduce the torque delivered per cycle. A third alternative is to lower the intake manifold pressure which will lower the air charge and torque for a given valve timing. This is achieved by using the throttle to control the manifold pressure as a function of valve timing and engine speed and integrating the valve and throttle control within the torque control structure. This can also improve low load torque control. Further, various combinations of the above approaches may be used, if desired.

Figure 4:
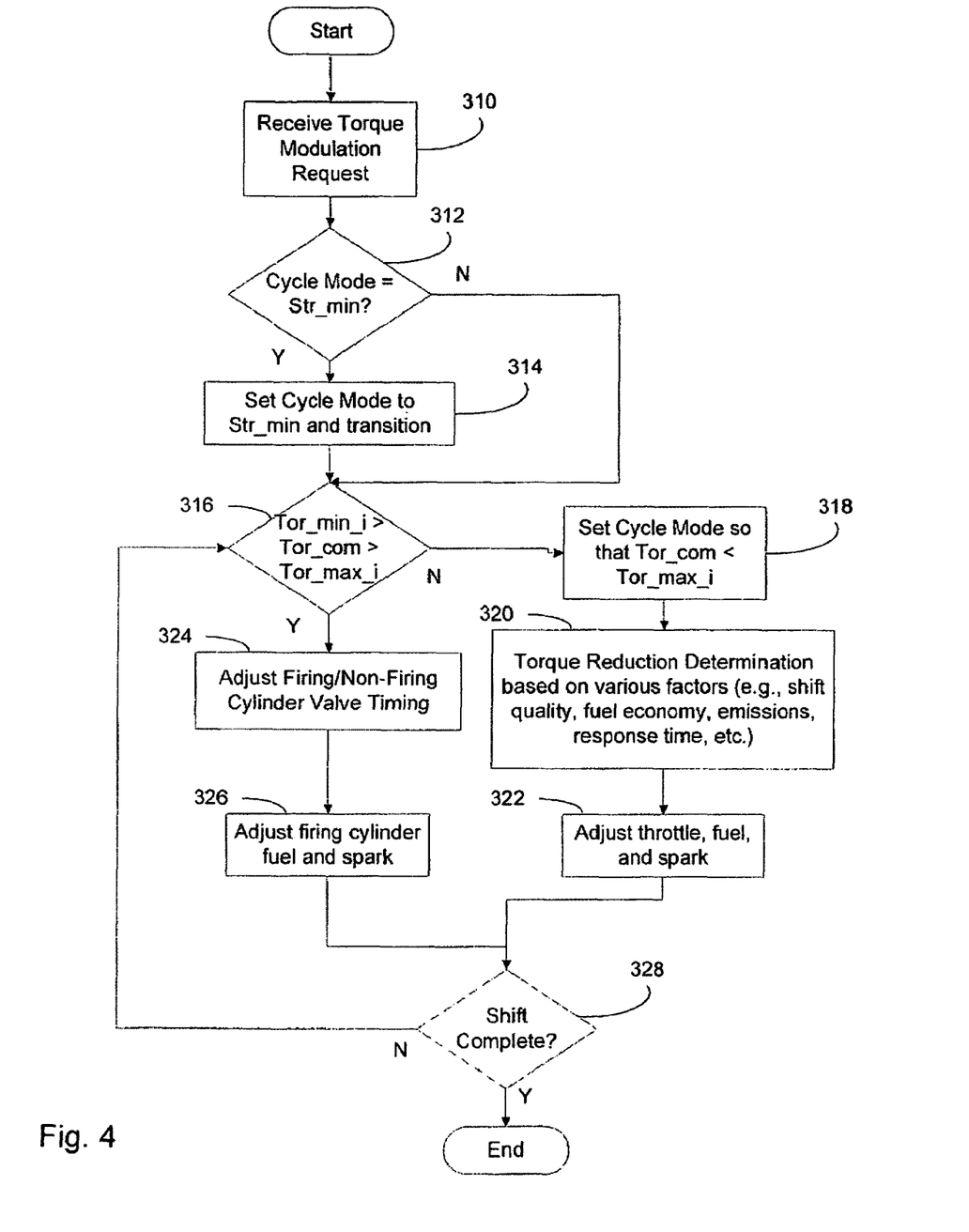
FIG. 4 is a high-level flow chart of various operations.

Referring now to FIG. 4, a routine is described for controlling engine and transmission operation during a gear ratio change, e.g., a shift. In one embodiment, the routine control engine valve timing, cylinder mode (e.g. enablement/deactivation), fuel injection, spark timing, and intake manifold pressure in response to a transmission torque modulation request to deliver improved shift quality.

In general terms, the routine first identifies a torque modulation request in step 310, which can be based on various parameters. In one example, the request is based on a desired torque increase profile and decrease profile that will provide improved shift feel, such as described herein.

Next, in step 312, the routine determines whether some or all of the cylinders are operating in a cylinder combustion cycle with the minimum number of strokes (Str_min). If not, the cylinder mode is set to a combustion cycle with this number of strokes. For example, the routine may switch the cylinder operating mode of one or more cylinders (or all cylinders) into a mode with a reduced numbers of cycles per firing event, e.g. 4-stroke operation vs. 24-stroke operation in step 314, to increase the engine torque responsiveness. In this way, it is possible to provide torque output changes from the engine more rapidly than otherwise possible. In other words, to provide sufficient responsiveness of the EVA engine to transmission torque modulation requests, firing cylinders are operating in low stroke mode.

Next, the routine continues to step 316 to determine whether the commanded cylinder torque (Tor_com) is within a range of the minimum possible torque (Tor_min_i, which may be defined by minimum intake valve opening time) and maximum possible torque (Tor_max_i). If not, the routine continues to step 318 to set the cylinder mode(s) so that the commanded cylinder torque (Tor_com) is within the range. For example, the routine may adjust the number of cylinders carrying out combustion (e.g., by activating cylinder valves or holding cylinder valves in a closed position throughout the cycle), may adjust the number of operating valves in a cylinder, may adjust intake/exhaust valve opening regions and/or closing regions (e.g., moving from late intake valve opening to early intake valve opening), or various other modifications. Next, in steps 320 and 322, the routine adjusts operating parameters, such as throttle position, fuel injection, spark timing, and others to provide the desired output.

If the answer to step 316 is Yes, the routine continues to step 324 to adjust the valve operation of both firing and non-firing cylinders, and then adjusts fuel and spark operation in step 325, to provide the desired torque.

In other words, the firing and non-firing cylinder modes are set to the mode that can most closely match the torque modulation request based on commanded torque increase or decrease. Further, the routine adjusts the firing cylinder valve timing, fuel and spark, and adjusts the non-firing cylinder valve timing, to approach the commanded torque. For example, in some cases, the torque request can be matched with valve timing and/or lift adjusts. In other cases, the torque reduction/increase request can not be achieved with valve timing alone. In such cases, the routine determine the desired combination of intake manifold pressure, fuel injection and/or spark retard that can be used to deliver the desired torque adjustment with the best fuel economy, shift quality, torque responsiveness and emissions. From this, the routine adjusts the intake manifold pressure, fuel and/or spark retard to deliver the commanded torque.

Also, in one specific example, the routine accounts for the maximum and minimum torque per cylinder as a function of engine mode and operating point, e.g. engine speed and load. In this case, the torque modulation request is converted into a per cylinder torque request that is consistent with the current engine operating mode, e.g. 4 vs. 8 firing cylinders on an 8 cylinder EVA engine. If an increase or decrease in the engine torque output is requested then the routine compares the maximum or minimum torque potential of the current engine operating mode with the request. If the torque request can be achieved in the current engine operating mode, then the valve timing, fuel, spark and intake manifold pressure are adjusted on the firing and non-firing cylinders to achieve the desired torque output. Otherwise, the engine operating mode is changed to accommodate the request, e.g. decreasing the number of firing cylinders from 8 to 4 to in response to a torque reduction request.

The maximum and minimum EVA engine torque for a given load and speed may be determined by the maximum and minimum firing and non-firing cylinder torques. The maximum cylinder torque on a firing cylinder may be limited by the maximum cylinder air charge, which can vary with engine speed and intake manifold pressure, and can be optimized by varying the intake valve timing on an EVA engine. The minimum cylinder torque per firing event on an EVA engine can be largely determined by the minimum valve duration, noted herein, which can limit the EVA valve actuator from reducing the cylinder charge below a fixed limit as a function of engine operating point. To extend to torque range below the minimum range allowed by the minimum valve duration, for a given number of firing cylinders, the non-firing cylinder valve timing can be controlled to reduce the engine torque further, or the intake manifold pressure can be reduced as noted here. One approach to reduce overall engine torque by increasing braking torque of non-firing cylinders is to adjust valve timing to generate expansion and/or compression braking during one or more strokes of the piston.

Returning to FIG. 4, from either steps 322 or 326 the routine continues to step 328 to determine whether the shift is complete. If not, the routine returns to step 316. Otherwise, the routine returns.

Thus, FIG. 4 shows an example method to convert torque modulation requests into valve timing, cylinder mode, fuel, spark and intake manifold pressure commands over the engine and transmission operating range. In one example, this method accounts for the maximum and minimum engine torque as a function of operating mode, engine speed and intake and exhaust manifold pressures, and is capable of rapidly responding to transmission torque modulation requests. Further, the above approach can be used in combination with control of on-coming and/or off-going clutches via adjustment of clutch pressures, and timing of clutch pressure adjustments.

In some cases, when adjusting engine torque as described above, the resulting transmission output torque variation may be sensitive to the amplitude and timing of the engine torque modulation and the clutch pressure amplitude and timing. For example, there are a number of factors that may created variation in the engine torque output, e.g. valve timing or throttle control errors, runner length differences, base engine calibration errors, uncorrected ambient temperature or pressure variations, and the transmission clutch pressures, e.g. transmission calibration errors, part-to-part variations, uncorrected transmission fluid temperature variation, or combinations thereof.

Thus, in one example, adaptation of the engine torque modulation and/or the clutch pressure may be provided. For example, when varying valve timing of the engine to increase and decrease the engine torque output in response to a transmission torque modulation command during a shift, the valve timing can be varied in response to a slip ratio feedback signal (indicating slip ratio across an open, or partially open, torque converter) to improve control of the torque modulation level. For example, feedback of slip ratio can be used to automatically adjust or adapt the transmission torque modulation request during the inertia phase of a shift and thereby improve shift quality and consistency. As noted above, in one example, adjustment of the engine valves (e.g., valve timing, lift, number of valves, cylinder deactivation) can be used to adjust engine output torque during the shift in response to the slip ratio feedback signal to control the torque modulation level.

In this way, improved operation can be achieved by coordinating end-of-shift torque modulation and clutch pressure timing. Without such coordination, variations in the transmission output torque may be experienced at least under some conditions.

In one embodiment, the above transmission output variation can be reduced by varying the engine torque modulation near the end-of-shift operation, such as, for example, varying engine torque modulation and/or the clutch pressure slope and/or timing.

In another embodiment, an on-line adaptation method may be used to maintain the shift quality and consistency. For example, such an on-line method may use a measure or estimate of the transmission output and a specific measure of transmission output variation due to end-of-shift torque modulation/clutch pressure timing errors. Further, the end-of-shift torque modulation timing and/or slope may be adjusted/adapted using a measure of the transmission output angular acceleration variation. This angular acceleration variation measure can be calculated using a filtered or averaged estimate of the peak-to-peak transmission output shaft acceleration during a window, as a function of time or crank angle degrees, following the end-of-shift event. An alternative to peak-to-peak acceleration would be vibration dose value, VDV. With such methods the shift quality and consistency can be maintained Example simulation data of various portions of the above approach is shown with regard to FIGS. 5-10. In this example, The EVA engine strategy provided modes that included only 4-stroke firing cylinder operation with an option to switch between four and eight firing cylinders. However, as noted above herein, addition modes may be used, such as increased strokes, and additional numbers of active cylinders, as well as variable number of active valves on either active or inactive cylinders.

The data discussed below shows the transmission output torque response during a tip-in from idle with a first to second gear up-shift, 1-2 up-shift, at 3,500 RPM. As shown in FIGS. 5-10 an improved transmission output torque response can be achieved by providing: a positive torque gradient during the torque phase, a torque reduction during the inertia phase, and a torque increase during the final phase.

Figure 5:
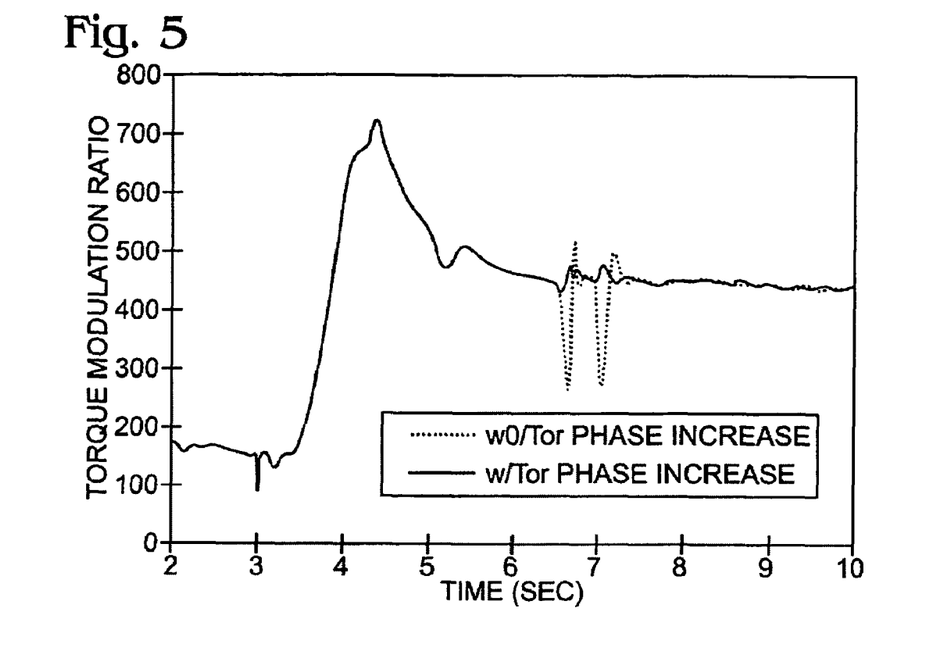
FIG. 5 shows an example tip-in transmission output torque response with and without torque modulation during a 1-2 up-shift torque phase.
Figure 6:
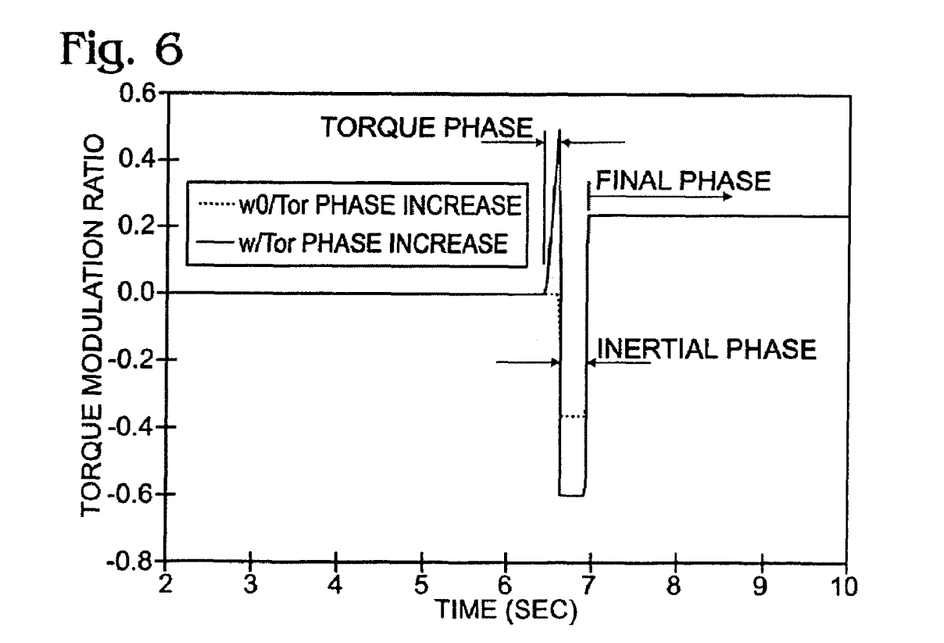
FIG. 6 shows a tip-in/1-2 up-shift transmission control torque modulation command.
Figure 7:
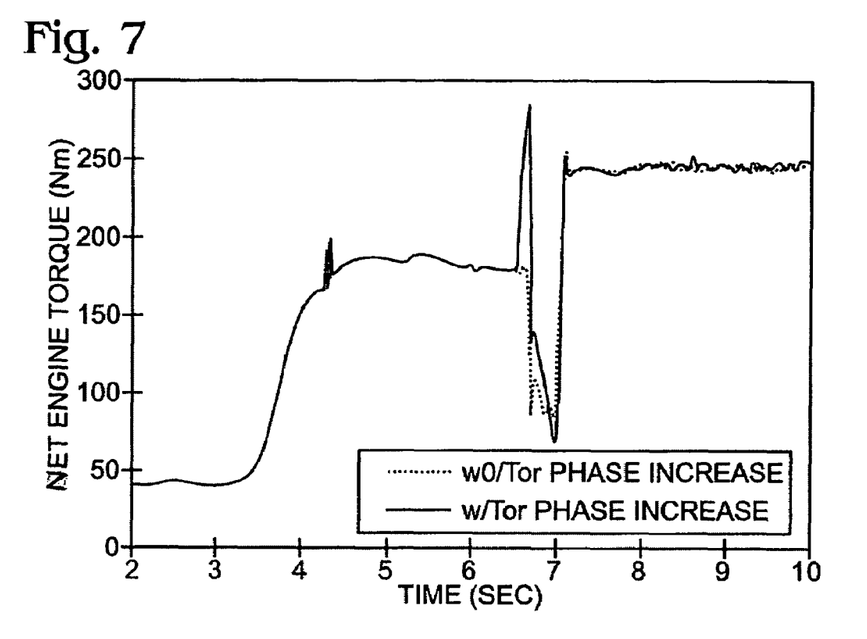
FIG. 7 shows a tip-in engine output torque response with and without torque modulation during a 1-2 up-shift torque phase.
Figure 8:
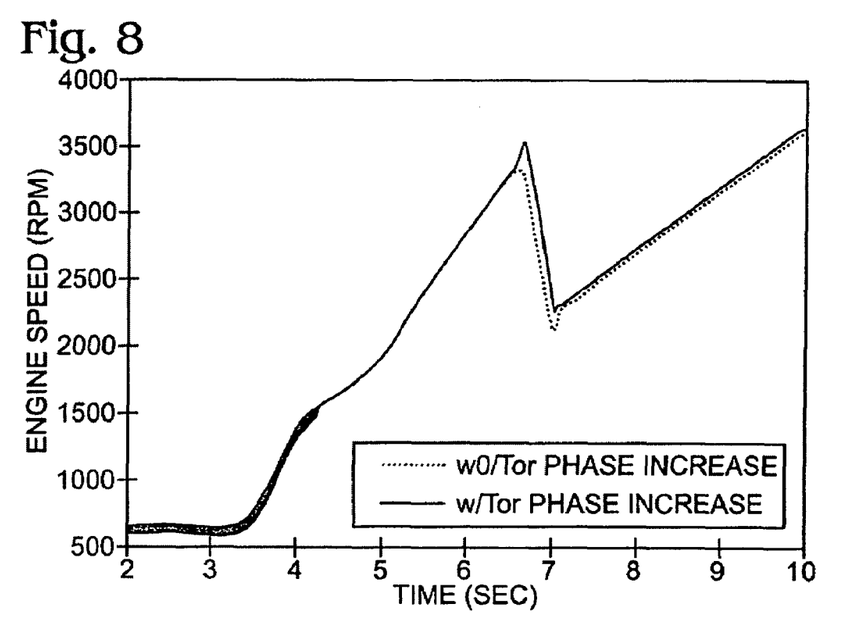
FIG. 8 shows a tip-in/1-2 up-shift engine speed response.

FIG. 5 shows a comparison of the above approach (solid line) to an approach using torque reduction alone (dashed), which produces increased deviations in the transmission output torque during the torque and inertia phases of the shift. FIG. 6 shows the commanded torque variation ratio, FIG. 7 shows the engine torque delivered, and FIG. 8 shows the engine speed responses.

Figure 9:
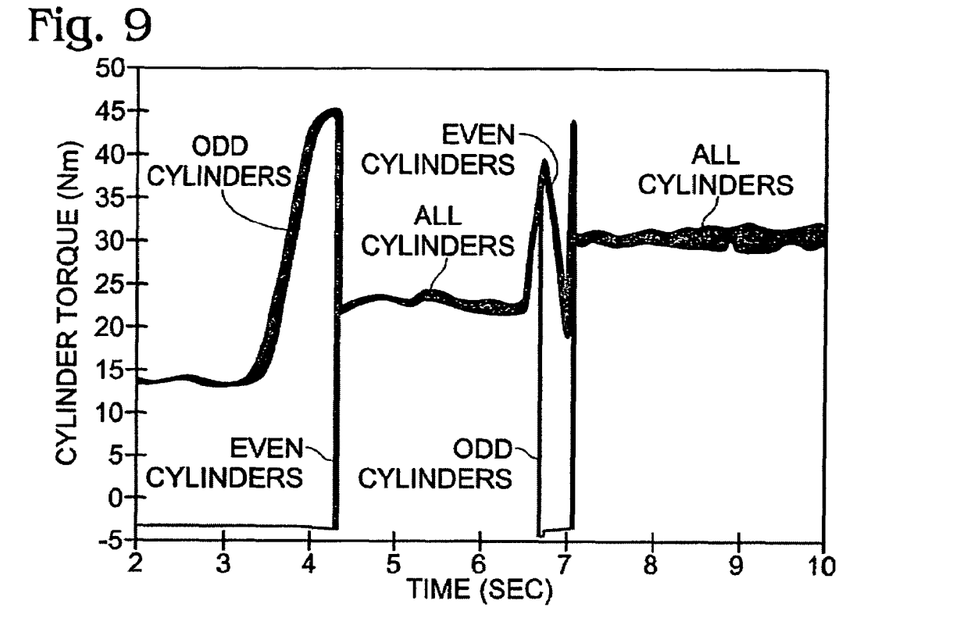
FIG. 9 shows a tip-in cylinder 1 through 8 torque response with torque modulation during a 1-2 up-shift torque phase.

The individual cylinder torques during the Tip-In and 1-2 shift are shown in FIG. 9. As shown in FIG. 9, the EVA engine runs in 4 cylinder mode during idle and the initial tip-in, (where 4-cylinder operation may be used in idle and low loads to increase fuel economy). Then, the engine mode switches to 8-cylinder mode in response to the tip-in torque request. When the engine speeds reaches roughly 2,500 RPM, the minimum torque in 8-cylinder mode exceeds the commanded engine torque based upon pedal command, and the commanded torque is greater than the maximum torque that can be produced in 4-cylinder mode. In this example, proportional feedback of the intake manifold pressure is used to control the cylinder charge and thereby control the engine torque when the minimum valve duration in 8 or 4 cylinder mode prevents the engine from matching the commanded torque with valve timing control alone. See, for example, the intake manifold pressure response which in shown in FIG. 10.

Figure 10:
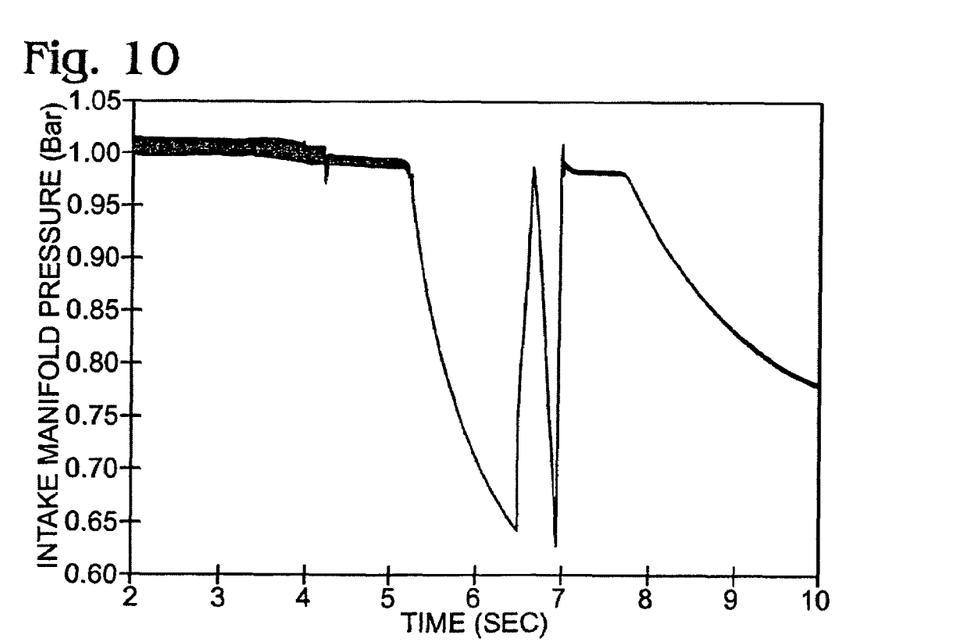
FIG. 10 shows a tip-in cylinder intake manifold pressure response with torque modulation during a 1-2 up-shift torque phase.

As shown in FIGS. 9 and 10, intake manifold pressure control is also used during the 1-2 shift inertia phase torque reduction request while the engine is in 4-cylinder mode. The intake manifold pressure was reduced in response to the inertia phase torque reduction request because the minimum torque available in the 4-cylinder mode, due to the minimum valve duration at 3,000 RPM, was greater than the commanded torque. An alternative to using intake manifold pressure reduction, in 4-cylinder mode would be to use the non-firing cylinders to generate sufficient pumping losses to match the commanded torque. By using the non-firing cylinders to reduce the engine output torque, it may be possible to more rapidly respond to torque reduction requests.

Note that the control routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling powertrain operation in a vehicle, the powertrain having an engine and an automatic transmission, the engine having at least an electrically actuated cylinder valve, the method comprising:
   changing gears from a first discrete gear ratio to a second discrete gear ratio of the transmission; and
   increasing engine torque during a torque phase of said gear change by changing operation of the electrically actuated cylinder valve, and decreasing engine torque during an inertia phase of said gear change,
   wherein said increasing engine torque during said torque phase of said gear change includes coordinated adjusting of valve timing of an electrically actuated intake valve and moving of a throttle plate,
   wherein said coordinated adjusting involves first reducing intake valve opening timing to reduce engine torque until reaching a minimum valve opening amount, and then further reducing a number of cylinders carrying out combustion along with adjustment of the throttle.

2. The method of claim 1 wherein said torque is decreased by retarding spark timing.

3. The method of claim 1 wherein said torque is decreased by changing intake valve timing of the electrically actuated cylinder intake valve.

4. The method of claim 1 wherein said torque is decreased by closing a throttle valve.

5. The method of claim 1 wherein said torque is decreased by reducing a number of cylinders carrying out combustion.

6. A method for controlling powertrain operation in a vehicle, the powertrain having an engine and an automatic transmission, the engine having at least an electrically actuated cylinder intake valve, the method comprising:
   modifying a number of strokes in a cycle of a cylinder having said electrically actuated cylinder intake valve;
   changing gears from a first discrete gear ratio to a second discrete gear ratio of the transmission; and
   increasing engine torque during a torque phase of said gear change by changing operation of the electrically actuated cylinder intake valve, and decreasing engine torque during an inertia phase of said gear change.

7. The method of claim 6 wherein said operation of the electrically actuated cylinder valve intake includes intake valve timing.

8. The method of claim 7 wherein said operation of the electrically actuated cylinder intake valve includes a number of intake valves operating in a cylinder.

9. The method of claim 8 wherein said operation of the electrically actuated cylinder intake valve includes enabling all intake valves of a cylinder thereby reinstituting combustion in the cylinder.

10. The method of claim 7 wherein said torque is decreased by retarding spark timing.

11. The method of claim 7 wherein said torque is decreased by closing a throttle valve.

12. The method of claim 9 wherein said torque is decreased by reducing a number of cylinders carrying out combustion.

13. The method of claim 6 wherein said increasing engine torque during said torque phase of said gear change includes coordinated adjusting of valve timing of the electrically actuated intake valve and moving of a throttle plate.

14. A powertrain system for a passenger vehicle traveling on the road, comprising:
   an engine, the engine having at least an electrically actuated cylinder intake valve;
   an automatic transmission;
   a torque converter coupled between the engine and the automatic transmission; and
   a controller configured to change gears from a first discrete gear ratio to a second discrete gear ratio of the transmission; and increase engine torque during a torque phase of said gear change by changing operation of the electrically actuated cylinder intake valve, and decrease engine torque during an inertia phase of said gear change, wherein changing operation is adjusted based on an amount of slip across the torque converter.

15. The system of claim 14 wherein said controller is further configured to provide an increasing transmission input torque gradient during the torque phase, and a torque decrease during the inertia phase coupled with corresponding control of on-coming and off-going clutch timing and capacity.

* * * * *